United States Patent
Fujiwara et al.

[11] Patent Number: 6,103,034
[45] Date of Patent: Aug. 15, 2000

[54] METHOD AND APPARATUS FOR WELDING HARD RESIN PRODUCT TO SUBSTRATE, METHOD OF MANUFACTURING WINDOW GLASS AND WINDOW GLASS

[75] Inventors: Kousyun Fujiwara; Yoshio Sasaki, both of Aichi-ken, Japan

[73] Assignee: Toyota Jidosha Kabushiki Kaisha, Toyota, Japan

[21] Appl. No.: 09/077,411

[22] PCT Filed: Oct. 8, 1997

[86] PCT No.: PCT/JP97/03614

§ 371 Date: May 28, 1998

§ 102(e) Date: May 28, 1998

[87] PCT Pub. No.: WO98/15401

PCT Pub. Date: Apr. 16, 1998

[30] Foreign Application Priority Data

Oct. 8, 1996 [JP] Japan ................................. 8-284616

[51] Int. Cl.⁷ .......................................... B32B 31/16
[52] U.S. Cl. ................. 156/73.1; 156/297; 156/309.6; 156/350; 156/580.1; 428/67
[58] Field of Search .................. 156/73.1, 297, 156/308.2, 309.6, 580.1, 580.2, 350; 264/442, 443, 445; 425/174.2; 428/38, 67

[56] References Cited

U.S. PATENT DOCUMENTS

| | | | |
|---|---|---|---|
| 5,110,381 | 5/1992 | Heckard et al. | 156/64 |
| 5,152,438 | 10/1992 | Gordon et al. | 222/546 |
| 5,601,669 | 2/1997 | Moody et al. | 156/73.1 |
| 5,653,832 | 8/1997 | Thompson et al. | 156/73.1 |
| 5,759,319 | 6/1998 | Moody et al. | 156/73.1 |

FOREIGN PATENT DOCUMENTS

| | | |
|---|---|---|
| 48-21724 | 3/1973 | Japan . |
| 49-27105 | 7/1974 | Japan . |
| 2-258413 | 10/1990 | Japan . |
| 3-70626 | 3/1991 | Japan . |
| 4-372626 | 12/1992 | Japan . |
| 5-57797 | 3/1993 | Japan . |
| 6-8330 | 1/1994 | Japan . |
| 6-32132 | 4/1994 | Japan . |
| 6-293534 | 10/1994 | Japan . |
| 6-298549 | 10/1994 | Japan . |
| 6-81726 | 11/1994 | Japan . |

*Primary Examiner*—James Sells
*Attorney, Agent, or Firm*—Burns, Doane, Swecker & Mathis, LLP

[57] ABSTRACT

The present invention discloses a method of melt-adhering a hard resin product to a substrate, wherein: a primer which includes a silane coupling agent is applied to a substrate which includes silicon, a hard resin product contacts a portion to which the primer has been applied, and the resin product is vibrated while pressure is applied thereto, and a melt-adhering apparatus which uses this method. A melt-adhering apparatus, comprising: a melt-adhering gun which includes a horn which can hold a resin product; a nipping stand which is movably disposed beneath the horn so that a substrate is nipped between the nipping stand and the horn; moving means which relatively moves the melt-adhering gun and the nipping stand; and a converter which subjects the horn to ultrasonic vibration in response to an input signal. In the present invention, the resin product can be securely melt-adhered to the substrate inexpensively.

7 Claims, 14 Drawing Sheets

METHOD AND APPARATUS FOR WELDING HARD RESIN PRODUCT TO SUBSTRATE, METHOD OF MANUFACTURING WINDOW GLASS AND WINDOW GLASS

BACKGROUND OF THE INVENTION

1. Field of the Invention

The present invention relates to a method of melt-adhering a hard resin product to a substrate formed by a material including silicon, an apparatus for implementing this method, a method of manufacturing a window glass in which a hard resin product is melt-adhered to a glass substrate, and a window glass which is manufactured in accordance with this method.

2. Description of the Related Art

As shown in FIG. 6, a window glass 10 is adhered to a mounting portion 11 of a vehicle body by a urethane sealer 12, and the urethane sealer 12 which attaches to the edge portion of the window glass 10 keeps the inside of the vehicle airtight. A stopper 14 is adhered beforehand to a predetermined position of the window glass 10. The stopper 14 is inserted through an opening portion 15 formed in the mounting portion 11 in such a way that, until the urethane sealer 12 is cured, the window glass 10 is temporarily held in a predetermined position (Japanese Utility Model Application Laid-Open (JP-U) No. 6-32132).

Conventionally, a urethane adhesive agent or a double sided tape is used for adhering the stopper 14 to the window glass 10. However, because of the time it takes for the urethane adhesive agent to dry, there is a need to have an empty space or the like for leaving the window glass 10 in, until the urethane adhesive agent is dried. The cost of manufacturing is thereby increased. In contrast to this, when the double sided tape is used, no special equipment is required, and the tape is inexpensive. However, because the adhesive strength of the double sided tape is low, when the weight of the window glass 10 is applied to the stopper 14, the stopper 14 may come away from the window glass 10.

SUMMARY OF THE INVENTION

An object of the present invention is to provide a method of melt-adhering a hard resin product to a substrate, in which a hard resin product can be securely adhered to a substrate inexpensively, and an apparatus for implementing the method.

Further, another object of the present invention is to provide a method of manufacturing a window glass, in which a hard resin product such as a stopper is securely melt-adhered to a glass substrate inexpensively, and a window glass which is manufactured in accordance with this method.

A first aspect of the present invention is a method of melt-adhering a hard resin product to a substrate, wherein: a primer which includes a silane coupling agent is applied to the surface of a substrate which includes silicon, a hard resin product contacts a portion to which the primer has been applied, and the resin product is vibrated while pressure is applied thereto.

The reaction mechanism of the first aspect of the present invention will be described as follows. The silane coupling agent included in the primer is subjected to hydrolysis by water in the atmosphere so as to form silanol. This silanol is subjected to dehydration and condensation with the silanol on the surface of the substrate, or is subjected to hydrogen bonding with the silanol on the surface of the substrate. Alternately, the alkoxy group in the silane coupling agent is adsorbed to the surface of the substrate. In this way, the primer is adhered to the substrate. On the other hand, the primer and the resin product are melt-adhered due to the melting of the resin product caused through vibration.

Because the primer and the substrate are adhered through a chemical reaction and the primer and the resin product are melt-adhered, the resin product is securely fixed to the substrate. Accordingly, even when force is applied to the resin product, it is difficult to remove the resin product from the substrate.

Further, since the melt-adhesion is effected in a short time, there is no need to have the extra space which is required when an adhesive agent is used, and the resin product can be melt-adhered to the substrate inexpensively.

A second aspect of the present invention is an apparatus for melt-adhering a hard resin product to a substrate, comprising: a melt-adhering gun which includes a horn which can hold a resin product; a nipping stand which is movably disposed beneath the horn so that a substrate is nipped between the nipping stand and the horn; moving means which relatively moves the melt-adhering gun and the nipping stand; and a converter which subjects the horn to ultrasonic vibration in response to an input signal.

In accordance with the second aspect of the present invention, the melt-adhering gun and the nipping stand are relatively moved by the moving means so that the substrate is nipped between the horn and the nipping stand. Next, while the resin product is held at a predetermined position on the substrate by the melt-adhering gun, the horn is subjected to ultrasonic vibration in response to a signal input from the converter, and the resin product is thereby melt-adhered to the substrate. In the second aspect of the present invention, the resin product can be securely melt-adhered to the glass substrate inexpensively in the same manner as in the first aspect of the present invention.

The third aspect of the present invention is a method of manufacturing a window glass, comprising the steps of: applying a primer including a silane coupling agent to a predetermined position on a glass substrate; disposing a hard resin product at a position on the glass substrate to which the primer has been applied, vibrating the resin product while pressure is applied thereto, so as to melt-adhere the hard resin product to the glass substrate; and adhering a molding to the edge portion of the glass substrate.

Further, the fourth aspect of the present invention is a window glass, in which a hard resin product is melt-adhered to a predetermined position, to which a primer including a silane coupling agent has been applied, by applied pressure and vibration, and in which a molding is adhered to the edge portion.

In the third and fourth aspects of the present invention, the resin product can be securely melt-adhered to the glass substrate inexpensively in the same manner as in the first aspect of the present invention.

DESCRIPTION OF THE PREFERRED EMBODIMENTS

Figure 1:
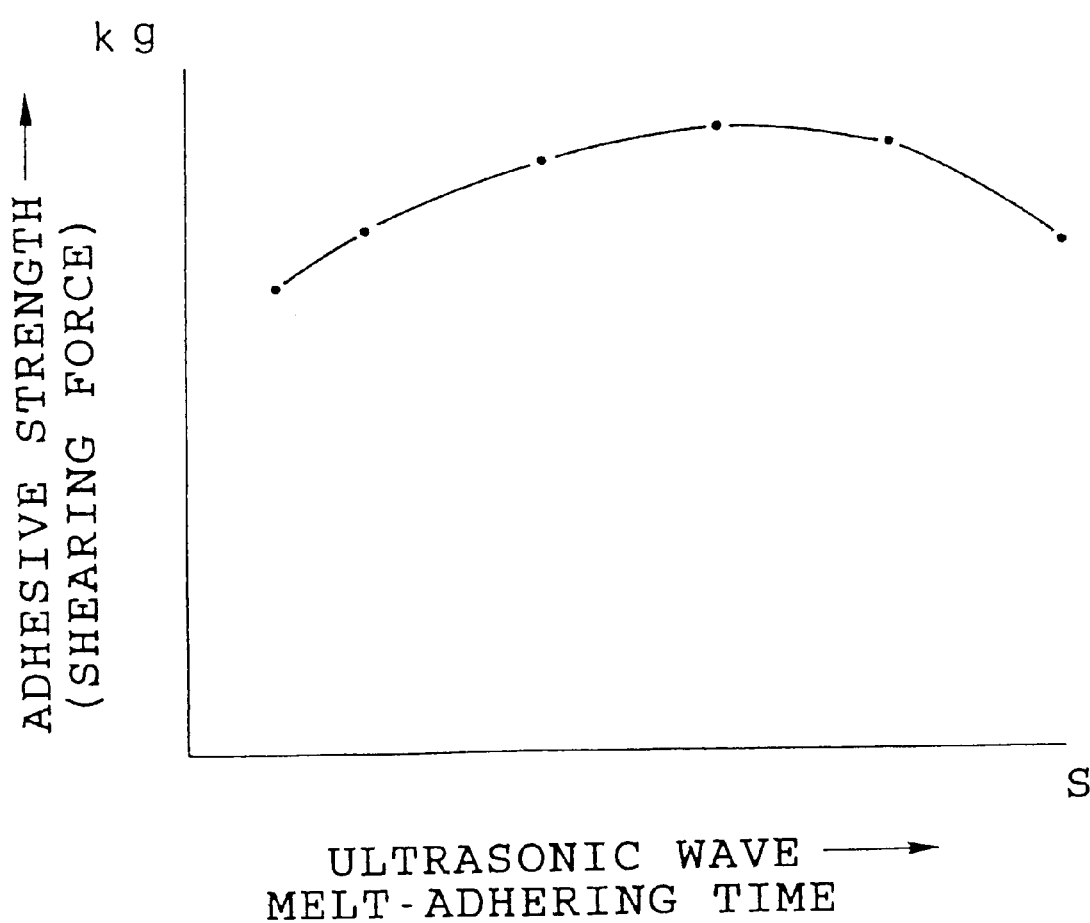
FIG. 1 is a graph which shows the relationship between the melt-adhering time of an ultrasonic wave and the melt-adhesive strength, wherein the applied pressure, the temperature of a glass, and the frequency are constant.

Firstly, a description will be given of a method of melt-adhering a hard resin product to a substrate including silicon in accordance with a first embodiment of the present invention.

In the first embodiment of the present invention, a primer is applied to the surface of the substrate including silicon.

The substrate including silicon can be formed by ceramics including silicon such as glass. The glass which can be used in the present invention includes silicon glass, hydrogen bonding glass including silicon, oxide glass such as silicate glass (e.g., silicic acid glass, alkali silicate glass, soda-lime glass, potash lime glass, lead (alkali) glass, barium glass, borosilicate glass).

The primer includes a silane coupling agent. As the silane coupling agent, vinyltriethoxysilane, vinyltris (2-methoxyethoxy) silane, 3-methacryloxypropyltrimethoxysilane, 3-glycydoxypropyltrimethoxysilane, 2-(3,4-epoxycyclohexyl) ethyltrimethoxysilane, N-2-(aminoethyl)-3-aminopropyltrimethoxysilane, N-2-(aminoethyl)-3-aminopropylmethyldimethoxysilane, 3-aminopropyltriethyoxysilane, N-phenyl-3-aminopropyltrimethoxysilane, 3-mercaptopropyltrimethoxysilane, 3-chloropropyltrimethoxysilane, and the like may be used.

In addition to the silane coupling agent, the primer includes a material, which has a solubility parameter similar to that of a resin product material such as polyamide, epoxy compound, and PVC, and solvent such as ethanol and the like. A material which has a solubility parameter similar to that of a resin product material can improve the adhesive strength between the resin product and the pruner.

Application by brush or roller, a dip coating method, a spray coating method, and the like can be used as the method of application.

In order to dry the primer quickly, it is preferable that the substrate be heated in advance by a heater, warm air, and the like before the application of the primer.

Next, in the first embodiment of the present invention, the hard resin product contacts the portion to which the primer has been applied. The hard resin product can be formed from a thermoplastic resin such as polyvinyl chloride (PVC), polybutylene terephthalate (PBT), and the like.

In order to reduce melt-adhering time, it is preferable that a melt-adhesion accelerating layer be interposed between the primer and the resin product. The melt-adhesion accelerating layer is preferably formed from a soft material (e.g., soft PVC or the like) which is compatible with, and melted quicker than, the material of the resin product. The soft PVC has an impact absorbing function in addition to the function of accelerating melt-adhesion.

Moreover, in the first embodiment of the present invention, the resin product is vibrated while pressure is applied thereto, and the resin product is melt-adhered to the substrate. The frequencies at the time of melt-adhesion can be appropriately selected. For example, an ultrasonic wave of 20 kHz or more, a high frequency wave of 3 to 30 MHz, or a frequency of 100 to 120 Hz and the like can be used.

Further, the applied pressure and the melt-adhering time at the time of melt-adhesion can be appropriately selected by experiments and the like.

FIG. 1 shows the relationship between the melt-adhering time of an ultrasonic wave and melt-adhesive strength wherein the applied pressure is 1.5 kgf/cm$^2$, the temperature of a glass is 50° C., and the frequency is 40 kHz. In FIG. 1, it is found that up to 3 seconds, the longer the melt-adhering time, the higher the adhesive strength, and after 3 seconds, the longer the melt-adhering time, the lower the adhesive strength. This is because the resin is melted in about 3 seconds and, if melt-adhesion is effected for more than 3 seconds, the horn bites into the melted resin due to the applied pressure at the time of melt-adhesion, and the thickness of the resin becomes partially thin. Therefore, under the above conditions, the suitable melt-adhering time is from 0.5 to 3.0 seconds, as far as high adhesive strength and low energy are taken into account.

Figure 2:
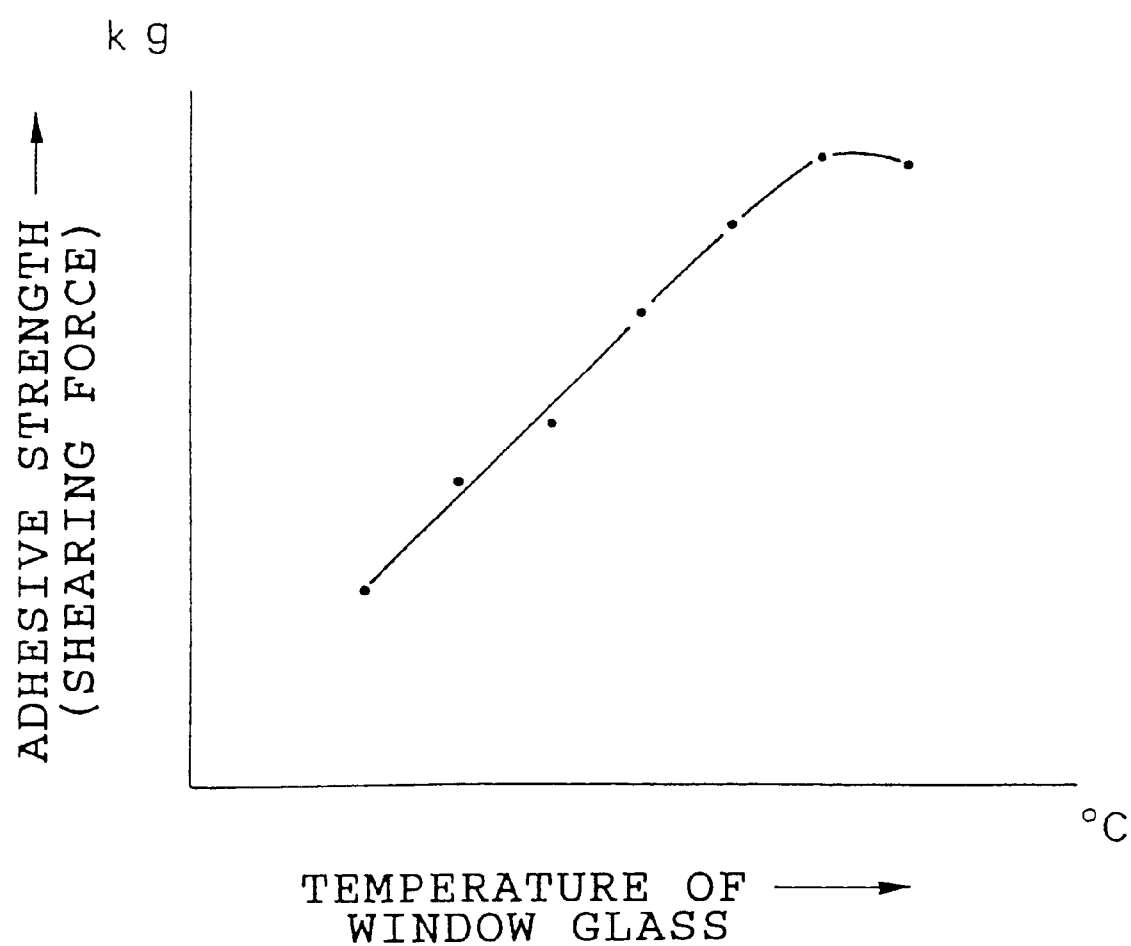
FIG. 2 is a graph which shows the relationship between the temperature of a glass and the adhesive strength, wherein the applied pressure, the melt-adhering time, and the frequency are constant.

Further, FIG. 2 shows the relationship between the temperature of a glass and the adhesive strength wherein the applied pressure is 1.5 kgf/cm$^2$, the melt-adhering time is 0.5 seconds, and the frequency is 40 kHz. In FIG. 2, it is found that up to about 70° C., the higher the temperature of the glass, the higher the adhesive strength, and when the temperature of the glass is 80° C. or higher, the adhesive strength remains the same as the strength at 70° C. This is because the horn begins to bite into the resin when the glass temperature is 80° C. or more. Therefore, it is considered that the suitable glass temperature is about 70° C. under the above conditions.

In addition to a case in which a resinous stopper is melt-adhered to the front glass, the method of melt-adhering a hard resin product to a substrate having silicon in accordance with the first embodiment of the present invention is applicable to a case in which a resinous glass holder is melt-adhered to a raising/lowering type door glass, a case in which a resinous stay of an internal rear view mirror is melt-adhered to a front glass, a case in which a resin product is melt-adhered to a window glass of a high-rise building, and the like.

Next, an explanation will be given of a method of manufacturing a window glass in accordance with the second embodiment of the present invention.

Figure 3:
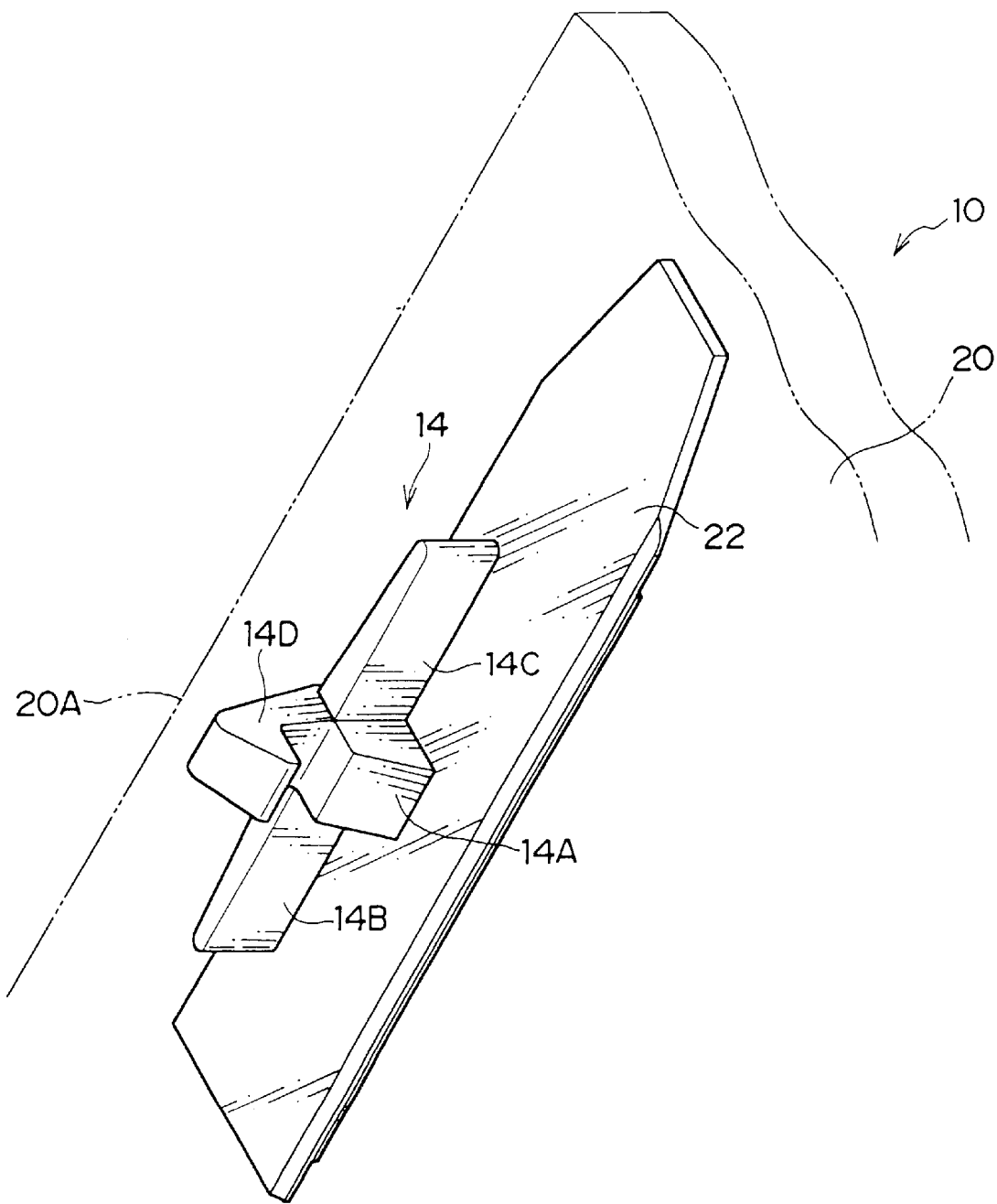
FIG. 3 is a perspective view of a stopper which is used in the present invention.

FIG. 3 shows a stopper 14 which is a hard resin product and is melt-adhered to a glass substrate 20 for a window glass 10. The stopper 14 is formed of PBT or hard PVC and is formed by a substantially rectangular parallelopiped base portion 14A, arms 14B and 14C which extend horizontally from the side surfaces of the base portion 14A, and a hook portion 14D which extends upward from the upper surface of the base portion 14A. Further, the bottom surface of the stopper 14 is adhered to a plate-shaped soft PVC sheet 22 so as to accelerate the melt-adhesion.

Figure 4:
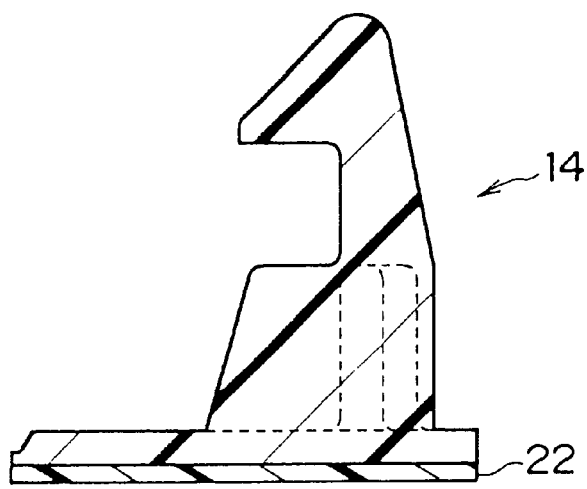
FIG. 4 is a cross-sectional view of the stopper in FIG. 3 and of a glass substrate to which a primer has been applied.
Figure 4:
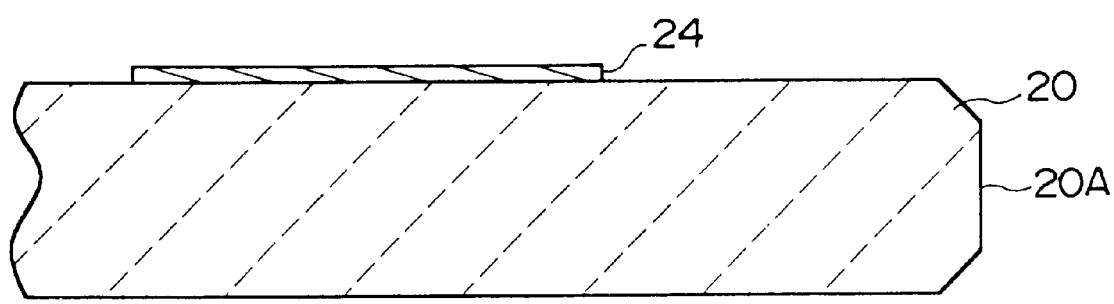

In the second embodiment of the present invention, as shown in FIG. 4, firstly, a primer 24 which includes a silane coupling agent is applied to the predetermined position of the glass substrate 20.

The glass used for the glass substrate 20 includes known glass for vehicles, e.g., sandwich glass and tempered glass.

Further, the silane coupling agent and the primer 24 including the same can be formed of the materials described hereinbefore.

Since it is necessary to apply the primer 24 selectively within the predetermined n arrow area, a brush is preferably used. Any known material can be used for the brush, however, durable synthetic fiber is more preferable.

In order to dry the primer 24 quickly, it is preferable to heat the glass substrate 20 in advance by warm air or the like before the primer 24 is applied thereto.

Figure 5:
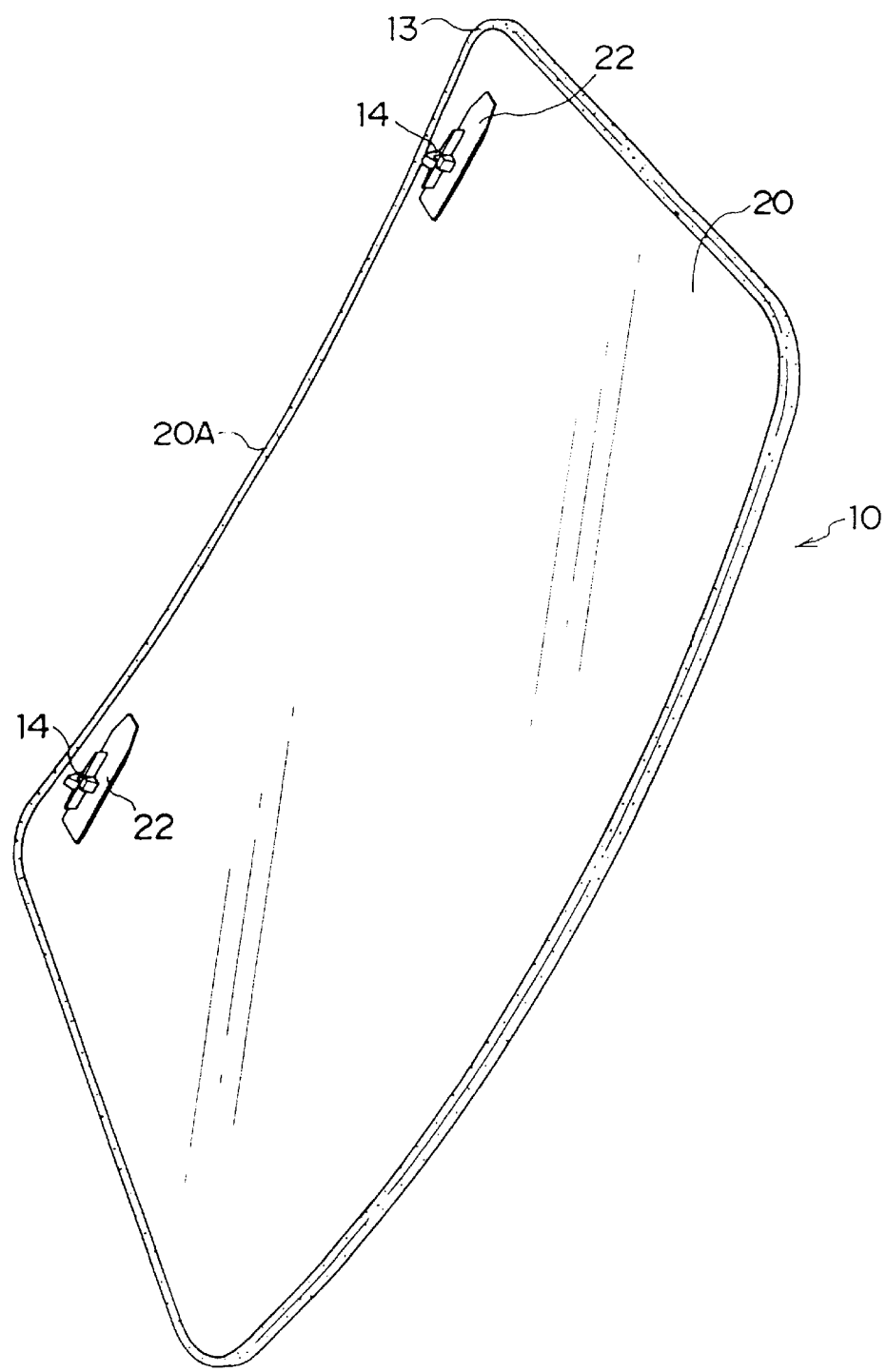
FIG. 5 is a perspective view of a window glass in which the stopper in FIG. 3 and molding are attached to a glass substrate.

Next, in the second embodiment of the present invention, as shown in FIGS. 3 and 5, the stopper 14 is disposed on the position of the glass substrate 20 to which the primer 24 has been applied, the stopper 14 is vibrated while pressure being applied thereto, and the stopper 14 is melt-adhered to the glass substrate 20.

The frequency, the applied pressure, and the melt-adhering time can be selected appropriately.

Figure 6:
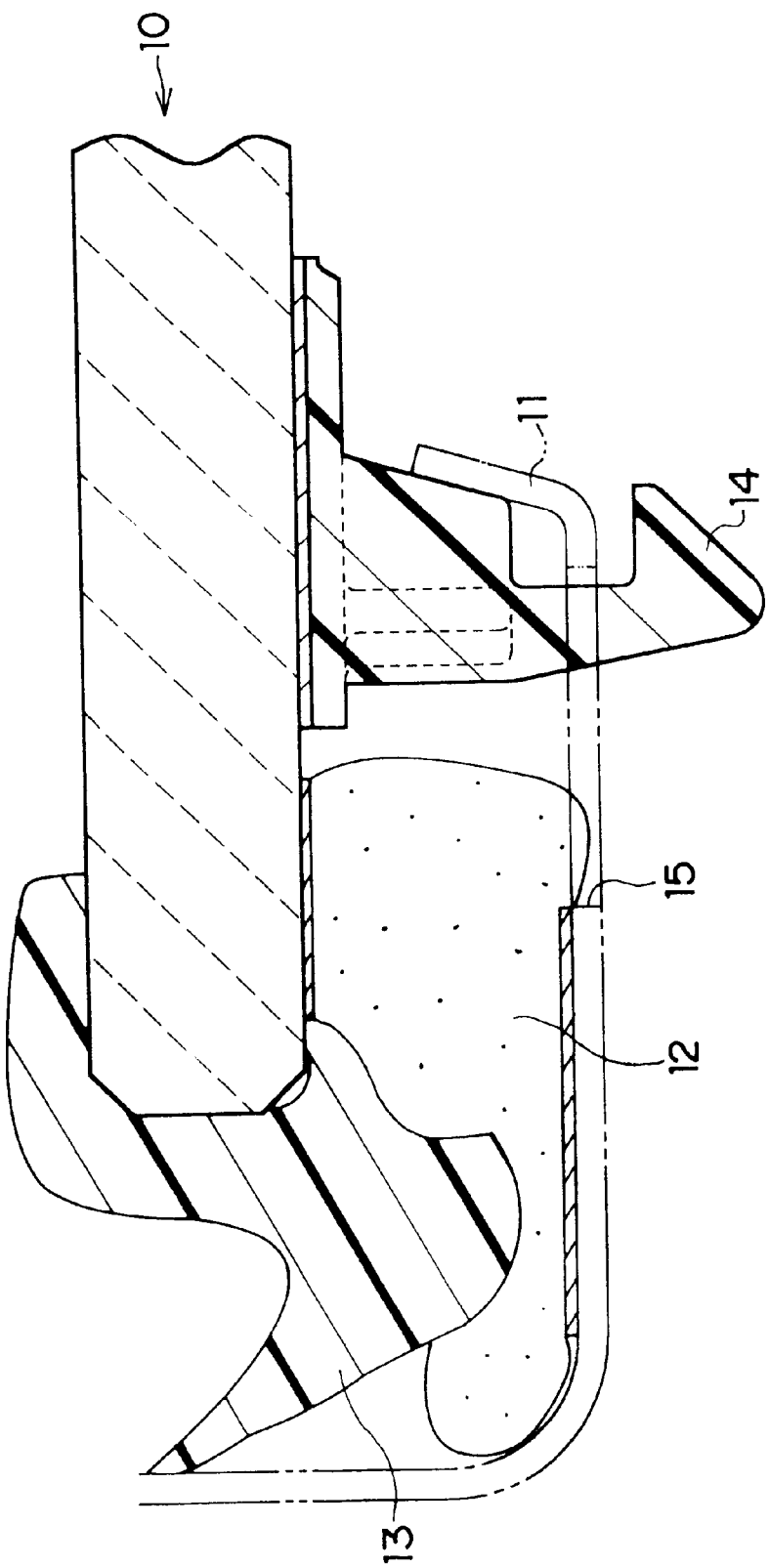
FIG. 6 is a cross-sectional view of a window glass which is mounted on a vehicle body.

Next, in the second embodiment of the present invention, as shown in FIGS. 5 and 6, a molding 13 is adhered to the edge portion of the glass substrate 20.

The molding 13 can be formed from conventionally-known molding materials.

An adhesive agent, an adhesive tape, and the like can be used for adhesion of the molding 13.

FIG. 5 shows the window glass 10 which is manufactured in accordance with the method of the second embodiment. In the window glass 10, the stopper 14 is melt-adhered to the vicinity of the corner of the glass substrate 20.

Figure 7:
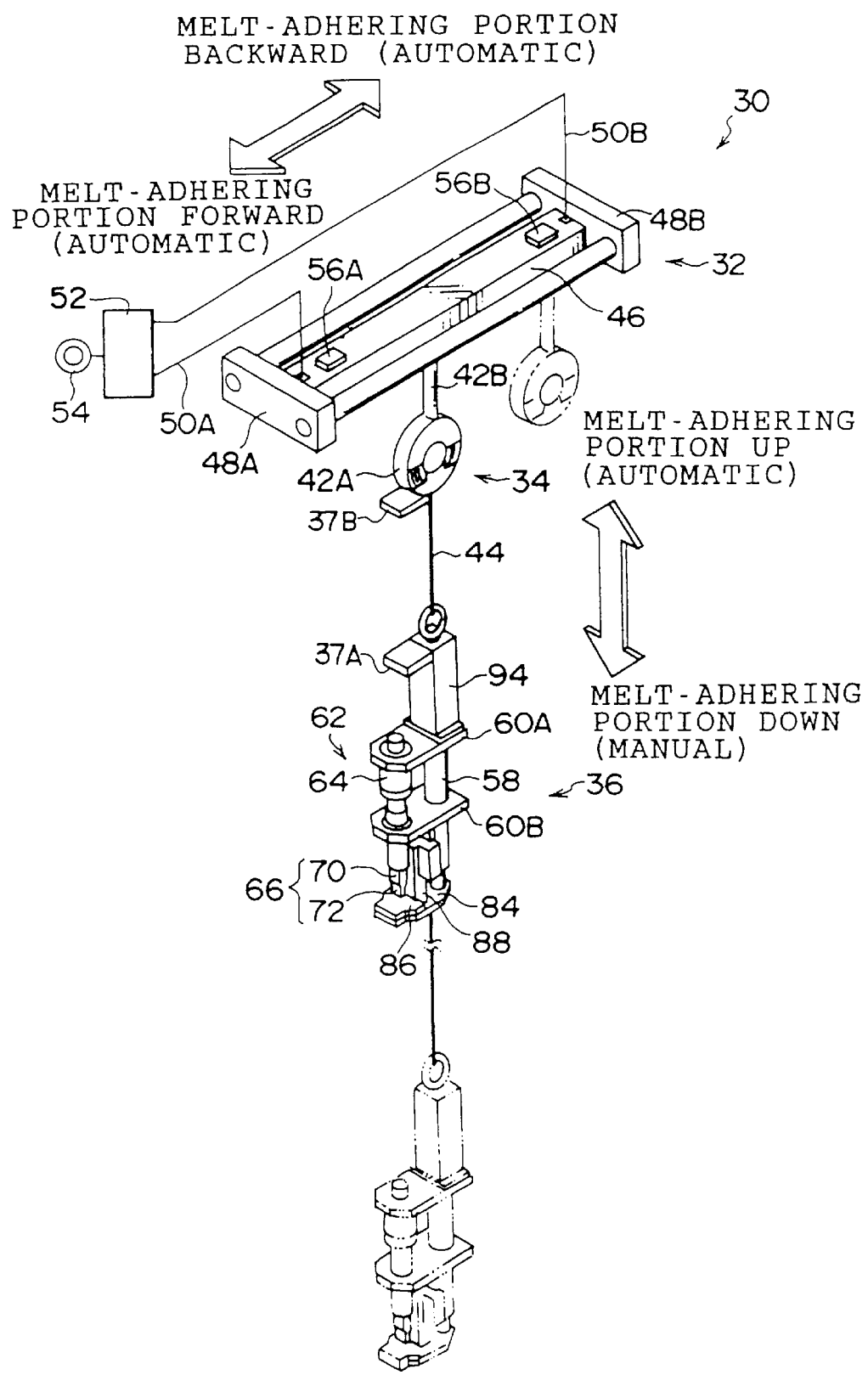
FIG. 7 is a perspective view which shows the schematic structure of a melt-adhering apparatus in accordance with a third embodiment of the present invention.
Figure 11:
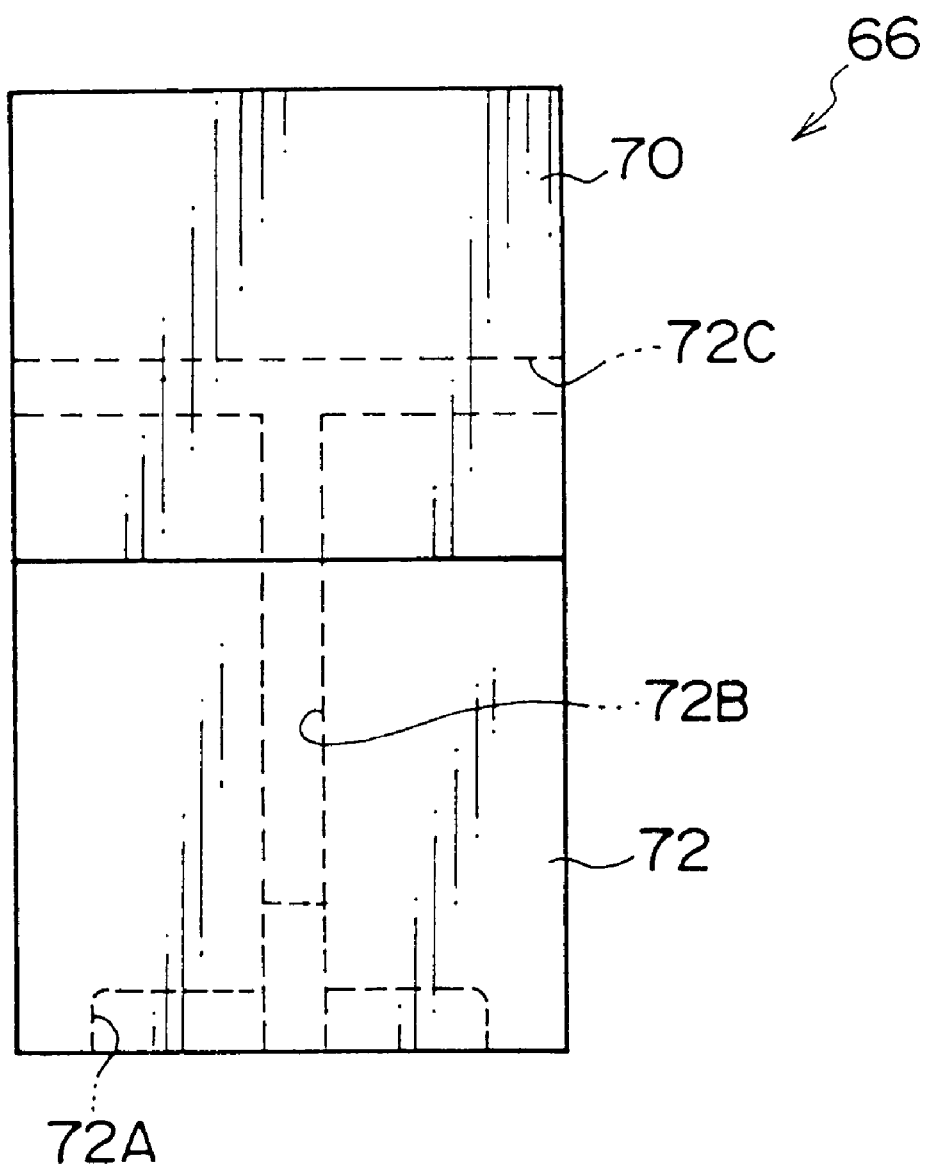
FIG. 11 is an elevational view of the horn in FIG. 10.
Figure 12:
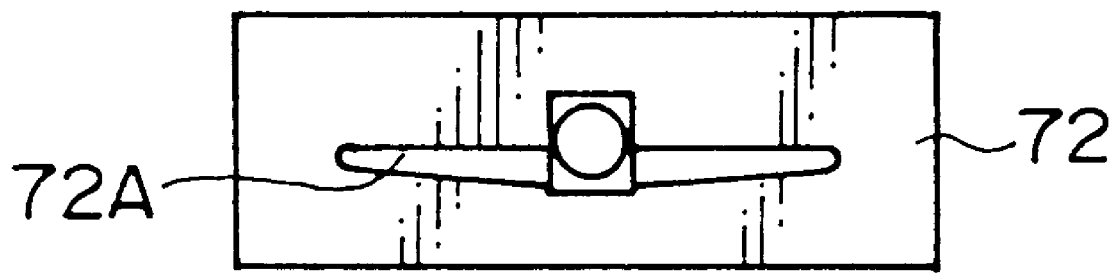
FIG. 12 is an end view of a second base portion of the horn when the stopper is suctioned to the horn in FIG. 10.
Figure 13:
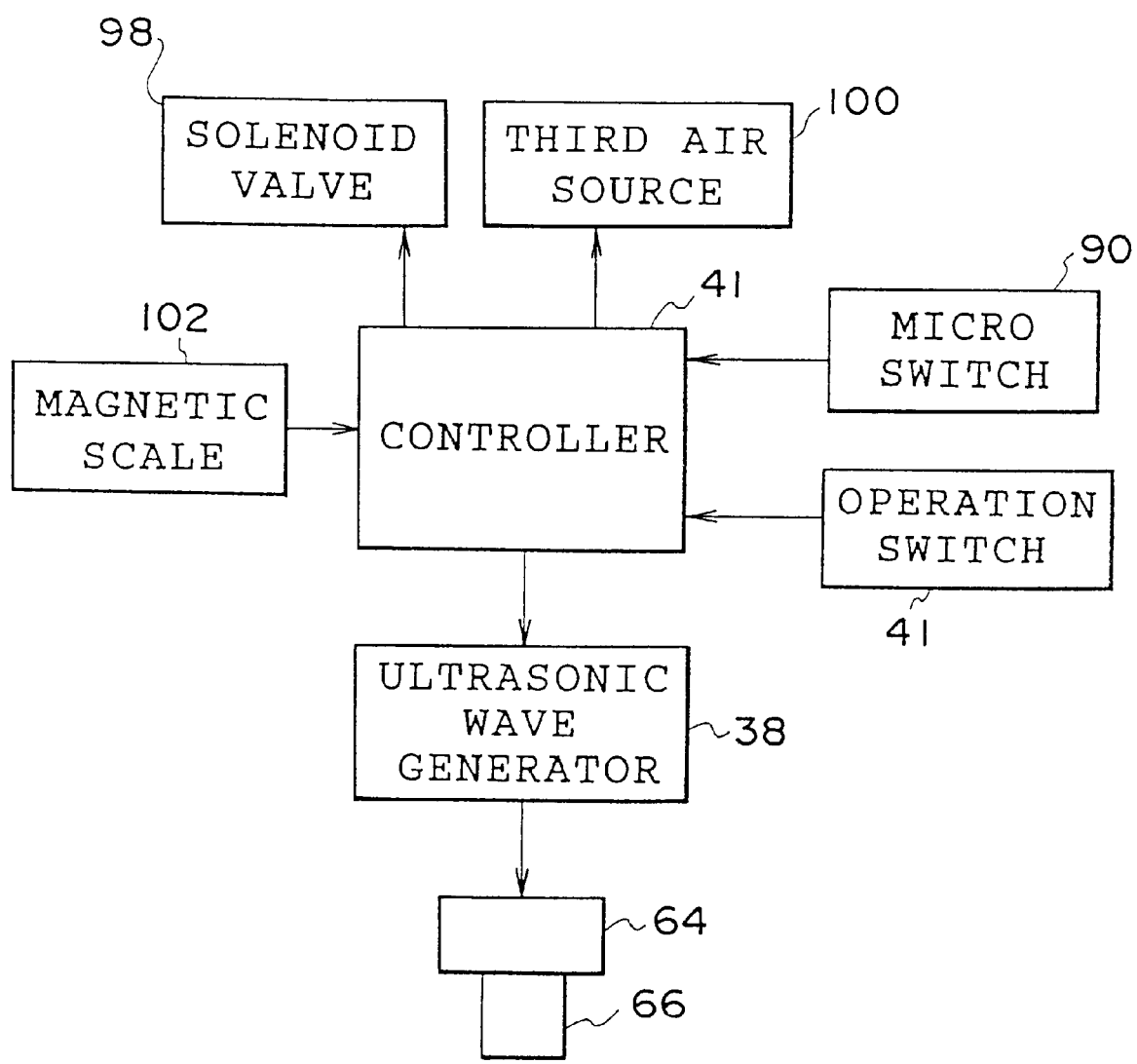
FIG. 13 is a block diagram of the melt-adhering apparatus in FIG. 7.

FIGS. 7 through 13 show a melt-adhering apparatus 30 of the third embodiment of the present invention which can be used in the above methods. As shown in FIG. 7, the melt-adhering apparatus 30 includes a supporting stand 32, which is provided at an upper side portion, a balancer 34, a melt-adhering portion 36, an ultrasonic wave generator 38 (FIG. 8), an operation switch 40 (FIG. 8), and a controller 41 (FIG. 13).

As shown in FIG. 7, the balancer 34 includes a substantially cylindrical main body 42A, in which an opening (unillustrated) is formed at the lower end portion of the outer periphery, and a rod-shaped supporting portion 42B, which extends directly upward from the upper portion of the main body 42A. A wire winding device (unillustrated), which normally urges a wire in the winding direction, and a wire 44, which is taken up onto the wire winding device, are accommodated within the main body 42A. One end of the wire 44 is exposed from the opening formed at the main body 42A, and when the wire 44 is pulled downward, the wire winding device automatically takes up the wire 44.

A supporting stand 32 includes a pipe-shaped air cylinder 46 which is provided horizontally, and the end portions of the air cylinder 46 are continuous with a pair of plates 48A, 48B which are provided in the direction orthogonal to the axial direction of the air cylinder 46. An unillustrated slit is formed at the lower portion of the air cylinder 46 in the axial direction thereof, and the upper end portion of the supporting portion 42B of the balancer 34 penetrates through the slit and is accommodated within the air cylinder 46. Further, openings are formed on the upper surface of the air cylinder 46 at positions in the vicinities of the end portions thereof, and air hoses 50A, 50B are attached to the openings. The air hoses 50A, 50B are connected to a first air source 54 via a solenoid valve 52. As air is blown from the air hoses 50A, 50B to the air cylinder 46, the balancer 34 can move along the air cylinder 46. Further, limit switches 56A, 56B, for detecting the position of the balancer 34, are provided on the inner sides of the air cylinder 46 on the sides which are further toward the center of the air cylinder 46 than the openings, to which the air hoses 50A, 50B are attached.

On the other hand, the end portion of the wire 44, which is exposed from the main body 42A of the balancer 34, is connected to the melt-adhering portion 36. In this way, the melt-adhering portion 36 can be moved from an upper position (standby position), shown by a solid line in FIG. 7, to a lower position, and the melt-adhering portion 36 can be moved horizontally in accordance with the horizontal movement of the balancer 34.

At the upper end portion of the melt-adhering portion 36 and the lower end portion of the balancer 34, proximity switches 37A, 37B are mounted so as to detect when the interval between the upper end portion of the melt-adhering portion 36 and the lower end portion of the balancer 34 is smaller than a predetermined value. In this way, it can be confirmed that the melt-adhering portion 36 has returned from the lower position to the standby position.

Figure 9:
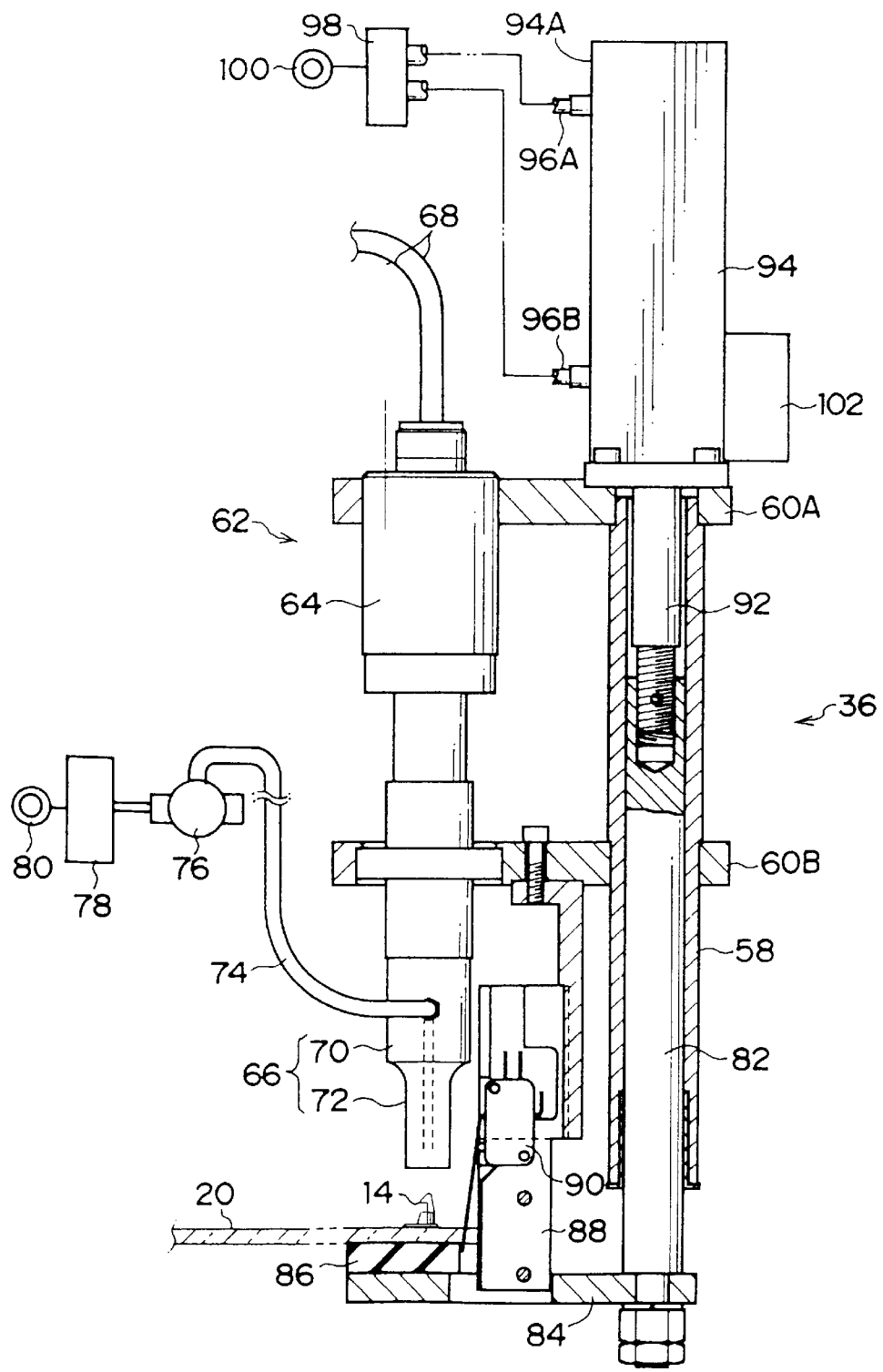
FIG. 9 is a partially cross-sectional view of the melt-adhering portion in FIG. 8.

As shown in FIG. 9, the melt-adhering portion 36 includes a cylindrical lower case 58 which is disposed in a vertical direction, and a pair of plate-shaped bases 60A, 60B horizontally extend outward from the upper end portion and the central portion of the lower case 58. Circular holes are formed in the bases 60A, 60B at the positions which are the same when viewed from directly above. A substantially cylindrical melt-adhering gun 62 whose outer diameter is substantially the same as those of the holes penetrates through the bases 60A, 60B, and the melt-adhering gun 62 is supported on the bases 60A, 60B so as to be parallel to the lower case 58.

The melt-adhering gun 62 includes a cylindrical converter 64, which converts electrical vibration to mechanical ultrasonic wave vibration, and a horn 66, which is connected to the lower portion of the converter 64. The converter 64 is connected to the ultrasonic wave generator 38 (FIG. 8) via an ultrasonic (or high frequency) wave cable 68. On the other hand, as shown in FIGS. 7 through 12, the horn 66 includes a rectangular parallelopiped first base portion 70, and a rectangular parallelopiped second base portion 72, which is continuous with the lower end of the first base portion 70, and is smaller than the first base portion 70.

Figure 10:
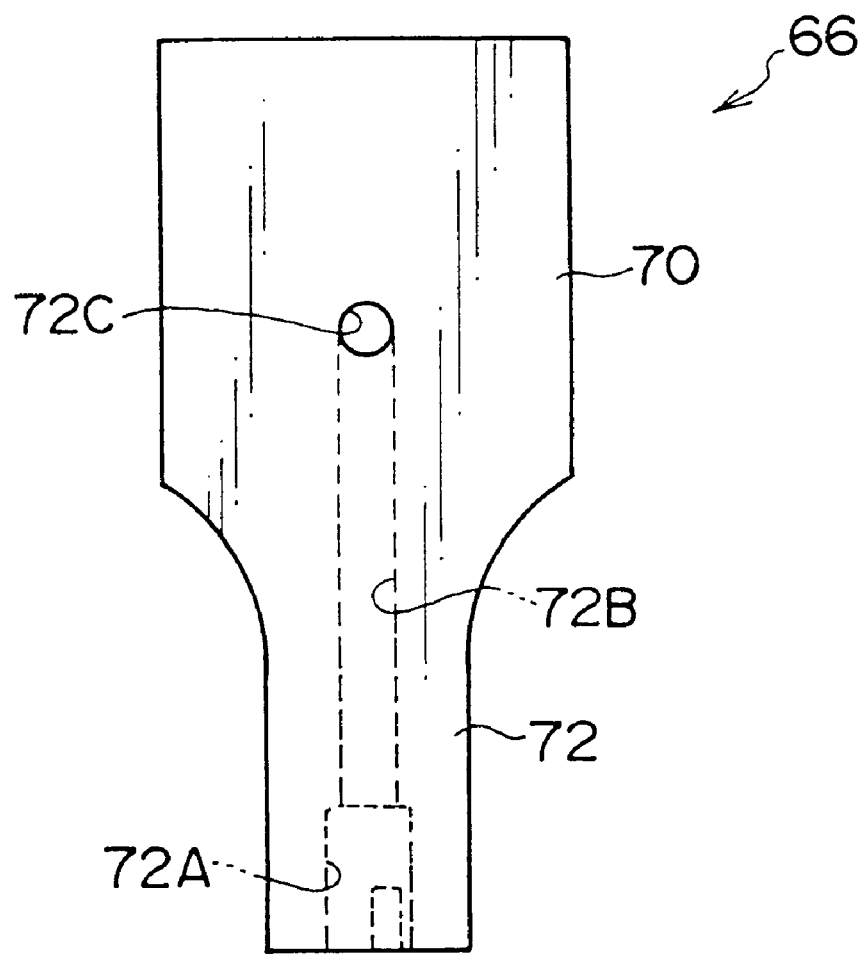
FIG. 10 is a side view of a horn in the melt-adhering portion in FIG. 9.

As shown in FIGS. 10 through 12, a concave portion 72A, which corresponds to the configuration of the resinous stopper 14, is formed at the bottom portion of the second base portion 72. Further, at the horn 66, a first hole 72B is formed directly upward from the upper portion of the concave portion 72A, and a horizontal second hole 72C which intersects the upper end portion of the first hole 72B is formed. As shown in FIG. 9, a hose 74 for suction is attached to the second hole 72C and is connected to a second air source 80 via an ejector 76 and a solenoid valve 78. As a result, when the stopper 14 is positioned on the glass substrate 20, the stopper 14 can be suctioned to the horn 66.

A shaft 82 is inserted into the underside of the lower case 58 so that the lower end thereof is exposed from the lower case 58. A base 84, which is a supporting stand for disposing the glass substrate 20, is horizontally attached to the lower end portion of the shaft 82, so that the base 84 is disposed below the horn 66. Moreover, on the base 84, an extending portion 88 for positioning is formed extending directly upward at a position which abuts an edge portion 20A (FIG. 5) of the glass substrate 20 when the portion of the glass substrate 20, to which the primer 24 has been applied, is disposed directly below the horn 66. The extending portion 88 includes a micro switch 90 for detecting the abutment of the glass substrate 20 and the extending portion 88. Further, a urethane pad 86, which absorbs impact when the horn 66 presses the glass substrate 20, is fixed to the distal end portion of the base 84.

On the other hand, the upper end portion of the shaft 82 is connected to a cylinder rod 92. The cylinder rod 92 is inserted into the lower case 58 so that the upper end portion thereof is exposed from the lower case 58. A flange (unillustrated), which extends in a radial direction and has a diameter larger than the inner diameter of the lower case 58, is formed a t the upper end portion of the cylinder rod 92. As a result, the cylinder rod 92 is engaged at the upper end of the lower case 58. Above the cylinder rod 92, there is a box-shaped upper case 94 which is mounted on the upper surface of the base 60A and is provided with a cylindrical concave portion (unillustrated) having a diameter larger than that of the flange of the cylinder rod 92.

On the side wall 94A of the upper case 94, through-holes are formed in the vicinity of the upper end portion and in the vicinity of the lower end portion respectively. These through-holes are connected to air hoses 96A, 96B, and the air hoses 96A, 96B are connected to a third air source 100 via a solenoid valve 98. As air is blown into the upper case 94 via the air hoses 96A, 96B, the cylinder rod 92 is moved vertically. Moreover, the shaft 82 is moved vertically in accordance with the vertical movement of the cylinder rod 92. As a result, the base 84 is moved vertically and the glass substrate 20 can be nipped between the base 84 and the horn 66.

Further, a magnetic scale 102 for measuring the distance the cylinder rod 92 is moved, i.e., the distance between the base 84 and the horn 66, is mounted on the upper case 94.

Figure 8:
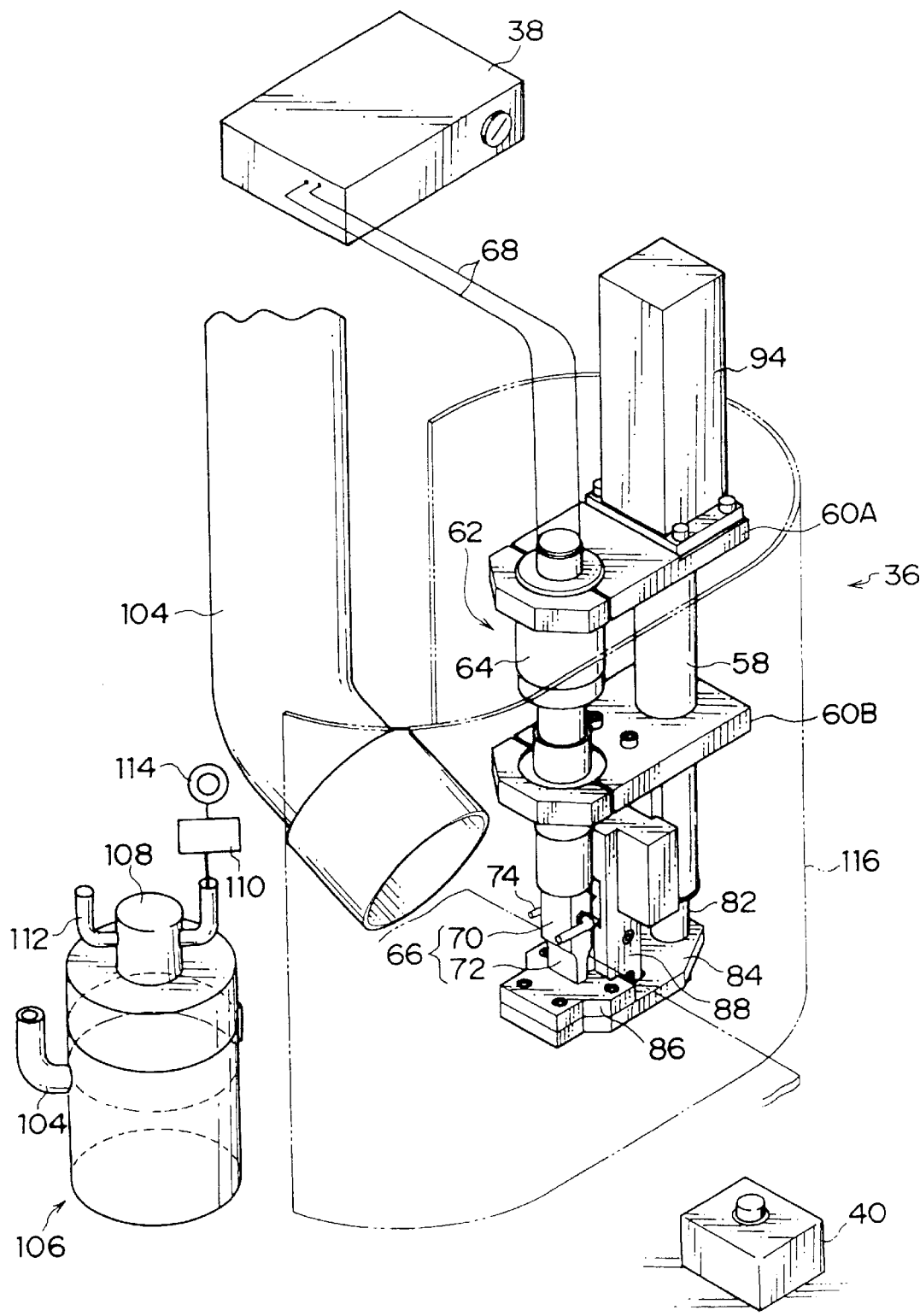
FIG. 8 is a perspective view in which a melt-adhering portion of the melt-adhering apparatus in FIG. 7 is enlarged.

Moreover, as shown in FIG. 8, one end of a gas suction duct 104 for suctioning the gas generated by the melt-adhesion is disposed in the vicinity of the horn 66, so that the gas suction duct 104 can be moved integrally with the melt-adhering gun 62. The other end of the gas suction duct 104 is connected to a vacuum type suction device 106. The suction device 106 includes an ejector 108, a solenoid valve 110 which is connected to the ejector 108, a pipe 112 which is connected to the ejector 108 and whose one end is opened, and a fourth air source 114 which is connected to the solenoid valve 110. Activated carbon for adsorbing chlorine or the like from the exhaust gas is loaded into the suction device 106.

The melt-adhering portion 36 also includes a cover 116 which covers the lower case 58 and the melt-adhering gun 62 for preventing diffusion of gas. A handle (unillustrated) which an operator grips to pull the melt-adhering portion 36 downward is mounted on the cover 116.

The operation switch 40 is provided so that, when one hand of the operator is gripping the handle mounted to the cover 116 and the other hand of the operator is placed between the horn 66 and the urethane pad 86, the other hand can not reach the operation switch 40 and that, when the one hand of the operator is gripping the handle mounted to the cover 116 and the other hand is not placed between the horn 66 and the urethane pad 86, the hand which is not gripping the handle can reach the operation switch 40.

As shown in FIG. 13, the controller 41 includes a CPU, a memory, a timer, and the like, and is connected to an ultrasonic wave generator 38 which is connected to the converter 64 of the melt-adhering gun 62, the micro switch 90 of the melt-adhering portion 36, the magnetic scale 102 of the melt-adhering portion 36, the operation switch 40, the third air source 100, and the solenoid valve 98.

The melt-adhering position of the glass substrate 20 is beneath the above-described melt-adhering apparatus 30, and a conveyor (unillustrated) is provided therebelow, so that the glass substrate 20, to which the primer 24 has been applied to the predetermined position of the upper surface, is conveyed to the melt-adhering position, and so that the glass substrate 20, to which the stopper 14 has been melt-adhered, is conveyed from the melt-adhering position to a subsequent operating position. The glass substrate 20 is conveyed so that, when the glass substrate 20 is disposed in the melt-adhering position, the edge portion 20A (FIG. 5) of the side of the glass substrate 20, to which the primer 24 has been applied, is disposed near the operator. Moreover, the melt-adhering apparatus 30 is provided so that the axial direction of the air cylinder 46 is substantially orthogonal to the conveying path of the conveyor and that, when the glass substrate 20 is disposed in the melt-adhering position, the limit switch, which is disposed on the operator's side (in the present embodiment, the limit switch 56A is disposed near the operator), is disposed further toward the side opposite the operator than directly above the position of the glass substrate 20 to which the primer 24 has been applied.

Figure 14:
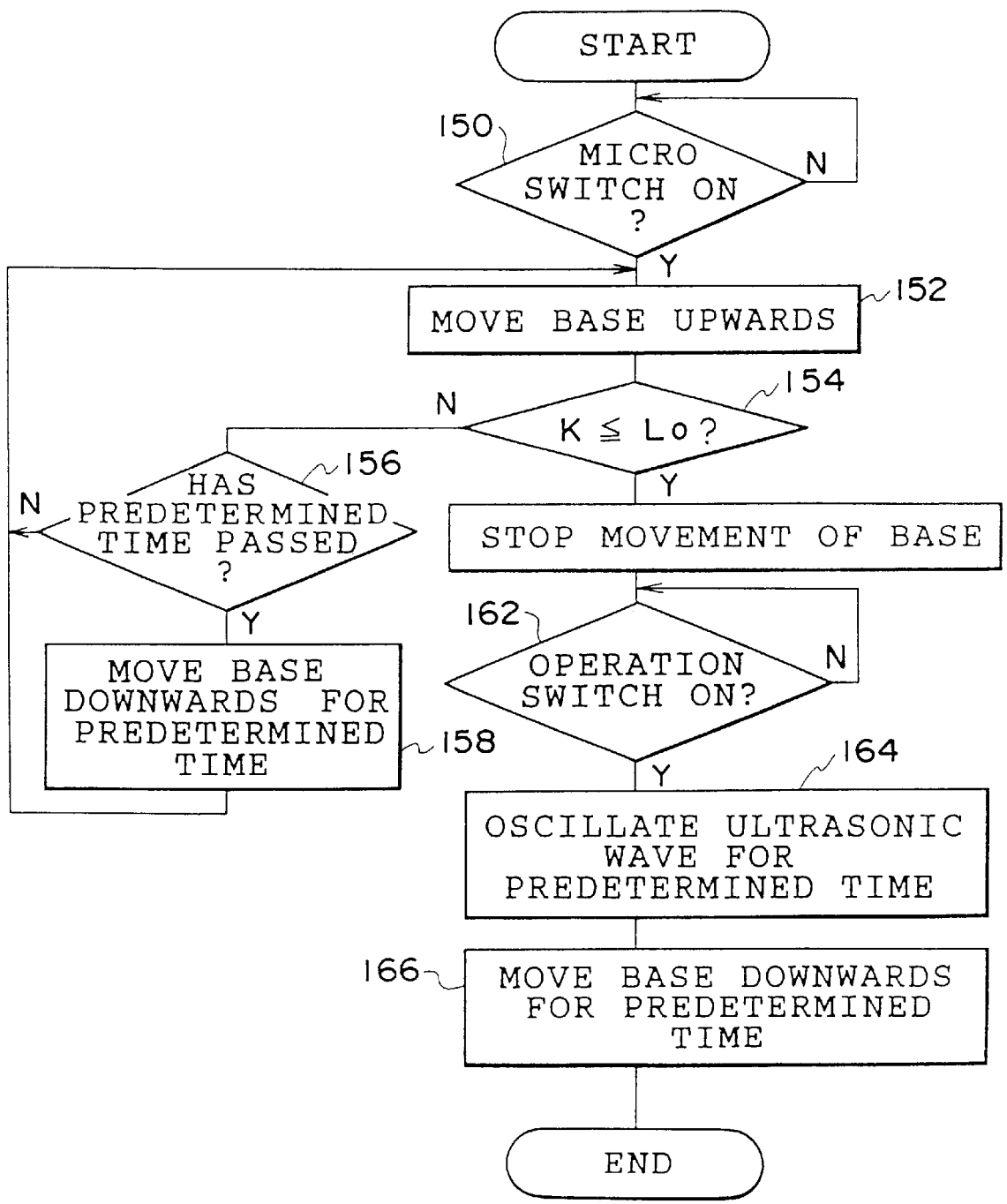
FIG. 14 is a flowchart of the melt-adhering apparatus in FIG. 7.

FIG. 14 shows a flowchart for explaining a control routine of the controller 41.

When an unillustrated power supply is turned on, the fourth air source 114 (FIG. 8), which is connected to the suction device 106, and the second air source 80 (FIG. 9), which is connected to the hose 74 for suction, are driven so that discharge and suction are started. Next, when the glass substrate 20 is disposed in the melt-adhering position, air is blown into the air cylinder 46 (FIG. 7), and the balancer 34 and the melt-adhering portion 36 are disposed directly below the limit switch 56A which is disposed on the operator's side. The control routine is thereby started.

The operator pulls the melt-adhering portion 36 from the standby position shown by a solid line in FIG. 7 to the diagonally downward side (the operator's side) via the unillustrated handle which is mounted to the cover 116 (FIG. 8) so as to cause the stopper 14 to be suctioned to the lower end portion of the horn 66. Next, the operator attaches the melt-adhering gun 62 to the glass substrate 20 so that the portion of the glass substrate 20, to which the primer 24 has been applied, is nipped between the horn 66 and the urethane pad 86 and that the edge portion 20A of the glass substrate 20 abuts the extending portion 88. In this way, the micro switch 90 is turned on.

In step 150, a determination is made as to whether the micro switch 90 is turned on. When the micro switch 90 is not turned on, the process waits. On the other hand, when the micro switch 90 is turned on, the process goes to step 152 where the solenoid valve 98 is opened, the third air source 100 is driven so that air is injected from the air hose 96B (FIG. 9) to the upper case 94 and is discharged from the air hose 96A, and the base 84 is moved upward.

In a subsequent step 154, a distance k between the base 84 and the horn 66 is measured by the magnetic scale 102 and a determination is made as to whether the distance k is smaller than or equal to a predetermined value $L_0$ (sum of the thickness of the glass substrate 20 and the urethane pad 86), i.e., whether a foreign object is caught between the glass substrate 20 and the horn 66, or between the glass substrate 20 and the urethane pad 86. When the answer to the determination in step 154 is "No", in step 156, a determination is made as to whether a predetermined time (the time which is necessary to move the base 84 from the position in FIG. 9 to the position at which the distance between the urethane pad 86 and the horn 66 is equal to the thickness of the glass substrate 20) has passed since the movement of the base 84 was started.

When the answer to the determination in step 156 is "No", the process returns to step 152. Further, when the answer to the determination in step 156 is "Yes", in step 158, the third air source 100 is driven for a predetermined time so that air is injected from the air hose 96A (FIG. 9) to the upper case 94 and discharged from the air hose 96B, and the base 84 is lowered to the position in FIG. 9. Then, the process returns to step 152.

On the other hand, when the answer to the determination in step 154 is "Yes", in step 160, the third air source 100 is stopped, the solenoid valve 98 is closed, and the movement of the base 84 is stopped. Then, the process goes to step 162.

When the glass substrate 20 is nipped between the horn 66 and the urethane pad 86, the operator presses the operation switch 40 with the hand not holding the handle, and at the same time releases the handle.

In step 162, a determination is made as to whether the operation switch 40 is pressed. When the answer to the determination in step 162 is "No", the process waits. When the answer to the determination in step 162 is "Yes", in step 164, the ultrasonic wave generator 38 is made to oscillate ultrasonic waves for a predetermined time after a predetermined time has passed from the time in which the operation switch 40 is pressed.

An electrical signal oscillated by the ultrasonic wave oscillator 38 is sent to the converter 64 of the melt-adhering gun 62 and is converted into a mechanical ultrasonic wave vibration by the converter 64. The mechanical ultrasonic wave vibration is transmitted to a soft PVC sheet 22, which is adhered to the bottom surface of the stopper 14, and the glass substrate 20 via the horn 66. As a result, frictional heat is generated between the soft PVC sheet 22 and the glass substrate 20 so as to melt the soft PVC sheet 22. When the vibration of the horn 66 is stopped, the soft PVC sheet 22 sets and the glass substrate 20 and the stopper 14 are adhered.

In the subsequent step 166, the solenoid valve 98 is opened for a predetermined time, the third air source 100 is driven for a predetermined time so that air is injected from the air hose 96A into the upper case 94 and discharged from the air hose 96B, and the base 84 is lowered to the position in FIG. 9. Accordingly, the control routine ends.

When the melt-adhesion is completed, air is blown into the air cylinder 46, and the balancer 34 and the melt-adhering portion 36 are disposed further toward the operator's side than the limit switch 56A. In this way, the melt-adhering portion 36 is separated from the glass substrate 20, and is returned to the position shown by a dashed line in FIG. 7 by its own weight. At the same time, the wire winding device within the balancer 34 takes up the wire 44 and raises the melt-adhering portion 36 to the standby position. Next, air is blown into the air cylinder 46, and the balancer 34 and the melt-adhering portion 36 are horizontally moved to the limit switch 56B side (the side which is away from the operator).

Since the melt-adhering apparatus 30 can achieve short-time and partial melt-adhesion by using the ultrasonic waves, deformation of the stopper 14 due to the heat can be prevented. Further, because the glass substrate 20 is nipped between the horn 66 and the urethane pad 86, the operator can release the melt-adhering gun 62 during the melt-adhering time and can do the other work, and further, the ultrasonic waves are prevented from acting on the operator. Moreover, because the melt-adhering portion 36 is disposed near the operator only during the melt-adhering operation, the melt-adhering portion 36 does not disturb the operator's work and the operational efficiency can be improved. Further, the distance between the horn 66 and the base 84C is measured by the magnetic scale 102, and melt-adhesion is not effected when a foreign object is caught between the glass substrate 20 and the horn 66, or between the glass substrate 20 and the urethane pad 86. Furthermore, chlorine or the like, which is included in the gas generated during the melt-adhering operation, is adsorbed by the activated carbon loaded into the suction device 106, the exhaust gas does not adversely affect the environment. Still further, since the melt-adhering gun 62 is supported by the balancer 34 and weighs little to the operator, it is easier to carry out the melt-adhering operation.

In the melt-adhering apparatus 30, the respective members are moved by air. However, the members may be moved by a moving means such as a solenoid.

Further, in the melt-adhering apparatus 30, the stopper 14 is suctioned by air. However, the stopper 14 may be held by a frictional charge or the like.

Moreover, in the melt-adhering apparatus 30, the magnetic scale 102 is used as a sensor for detecting the distance between the horn 66 and the base 84. However, a known location sensor can be used as the sensor.

Furthermore, the melt-adhering apparatus 30 includes one melt-adhering portion 36. However, a melt-adhering portion 36 may be provided on both sides of the operator. When one of the melt-adhering portions 36 effects melt-adhesion, the operator attaches the other of the melt-adhering portions 36 to the glass substrate 20, thus improving the operational efficiency even further.

What is claimed is:

1. A method of melt-adhering a hard resin product to a substrate, wherein: a primer which includes a silane coupling agent is applied to the surface of a substrate which includes silicon, a hard resin product contacts a portion to which the primer has been applied, and the resin product is vibrated while pressure is applied thereto.

2. A method of melt-adhering a hard resin product to a substrate according to claim 1, wherein a melt-adhesion accelerating layer is interposed between the primer and the resin product.

3. An apparatus for melt-adhering a hard resin product to a substrate, comprising:
   a melt-adhering gun which includes a horn which can hold a resin product;
   a nipping stand which is movably disposed beneath the horn so that a substrate is nipped between said nipping stand and the horn;
   moving means which relatively moves said melt-adhering gun and said nipping stand;

a converter which subjects the horn to ultrasonic vibration in response to an input signal;

a sensor which detects the distance between the horn and said nipping stand;

a switch for outputting a melt-adhesion start signal; and a controller which drives said converter when the distance between the horn and said nipping stand is a predetermined value or less and the melt-adhesion start signal is output.

4. An apparatus for melt-adhering a hard resin product to a substrate, comprising:

a melt-adhering gun which includes a horn having a concave portion within which at least a portion of the resin product can be accommodated, and holes which communicate with the concave portion and the exterior;

a nipping stand which is movably disposed beneath the horn so that a substrate is nipped between said nipping and the horn;

moving means which relatively moves said melt-adhering gun and said nipping stand;

a converter which subjects the horn to ultrasonic vibration in response to an input signal;

a suction device which is connected to the horn so as to communicate with the holes formed in the horn;

a sensor which detects the distance between the horn and said nipping stand;

a switch for outputting a melt-adhesion start signal; and a controller which drives said converter when the distance between the horn and said nipping stand is a predetermined value or less and the melt-adhesion start signal is output.

5. An apparatus for melt-adhering a hard resin product to a substrate, comprising:

a melt-adhering gun which includes a horn which can hold a resin product;

a nipping stand which is movably disposed beneath the horn so that a substrate is nipped between said nipping stand and the horn;

moving means which relatively moves said melt-adhering gun and said nipping stand;

a converter which subjects the horn to ultrasonic vibration in response to an input signal; and a discharge device which discharges gas generated by melt-adhesion.

6. A method of manufacturing a window glass, comprising the steps of:

applying a primer including a silane coupling agent to a predetermined position on a glass substrate;

disposing a hard resin product at a position on the glass substrate to which the primer has been applied, vibrating the resin product while pressure is applied thereto, so as to melt-adhere the hard resin product to the glass substrate; and adhering a molding to the edge portion of the glass substrate.

7. A window glass, in which a hard resin product is melt-adhered to a predetermined position, to which a primer including a silane coupling agent has been applied, by applied pressure and vibration, and in which a molding is adhered to the edge portion.

* * * * *